C. FIELD.
DRYING PROCESS AND APPARATUS.
APPLICATION FILED JAN. 21, 1919.
1,423,928.
Patented July 25, 1922.
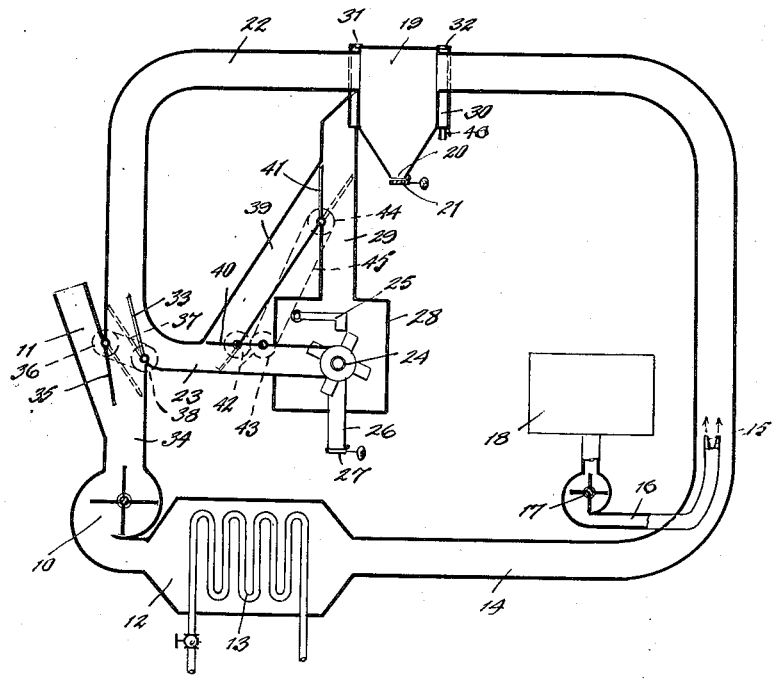
INVENTOR
Crosby Field
BY E. P. Goepel
ATTORNEY

UNITED STATES PATENT OFFICE.

CROSBY FIELD, OF WASHINGTON, DISTRICT OF COLUMBIA, ASSIGNOR TO CHEMICAL MACHINERY CORPORATION, OF NEW YORK, N. Y.

DRYING PROCESS AND APPARATUS.

1,423,928. Specification of Letters Patent. Patented July 25, 1922.

Application filed January 21, 1919. Serial No. 272,287.

*To all whom it may concern:*

Be it known that I, CROSBY FIELD, a citizen of the United States, and a resident of Washington, in the District of Columbia, have invented certain new and useful Improvements in a Drying Process and Apparatus, of which the following is a specification.

The present invention relates to an improved drying process and apparatus therefor, particularly for the drying of chemicals or other substances, the finished or dried product being in powdered form.

An object of the invention is to provide such a process and apparatus by which the drying of materials may be carried out in a reliable, efficient and economical manner and with relatively greater speed and uniformity of product than has heretofore been possible. A further object is to provide controlling means by which the process of drying may be accurately regulated.

With these and other objects in view, an apparatus adapted to carry out my invention is shown in the accompanying diagrammatic drawing and this embodiment will be hereinafter more fully described with reference thereto and the invention will be finally pointed out in the claims.

Referring to the drawing, the blower 10 causes a column of air or other drying medium to be drawn through the inlet duct 11 into the heating chamber 12, where it passes at high velocity over the heating coils 13, and thence at relatively higher velocity, and heated, through the conduit 14 which is of smaller diameter than the heating chamber.

Spray heads or nozzles 15, fed through a pipe 16 by the pump 17 from a tank 18, force the material to be dried in very small globules or particles into this column of heated air or other drying medium, which carries it to the dust catcher 19, the portion of the conduit between the point of injection of the material and the dust catcher being relatively long so that the material traverses a substantially great distance in company with the heating medium. The dried material, as it enters the catcher 19, falls from the column of air through the opening 20 which is normally closed by a valve 21 into a suitable conveyor or receptacle. The catcher 19 is preferably of the so-called cyclone or centrifugal type.

The air freed from the dried material, but still containing its moisture, and also such material as may have escaped the dust catcher 13, is carried from the dust catcher 19 through the conduits 22 and 23 into the secondary or supplemental dust catcher 24, the conduit 23 being a branch conduit from the continuous conduit composed of the sections 14, 22 and 34. The secondary dust catcher, preferably of the bag type, entraps the dust separating the same from the moist air and by means of the hammer device 25, causes the dried material to drop through the passage 26 normally closed by a valve 27 into a suitable conveyor or receptacle.

The supplemental dust catcher 24 is disposed in a housing 28 provided in its upper side with an outlet conduit 29 through which the air freed from the material passes into a jacket 30 disposed about the dust catcher 19, and escapes through the parts 31 and 32. A drain 46 is provided through which condensed moisture may escape. The object of jacketing the dust collector is to prevent the moisture from condensing on the inside of the dust collector as the drying medium, after passing through the system, will be quite warm and by passing it to the atmosphere through a jacket, it tends to keep the sides of the dust collector warm, and thus prevents too great a difference of temperature and losses by radiation which would result in condensation of moisture in the collector thus rendering the system less efficient.

A damper 33 is provided at the connection of the conduit 23 with the conduit 22 adapted when in the position shown in dotted lines, to cause the air to flow into the conduit 23, shutting off the continuation 34 of the said conduit 22 extending to the blower 10, and into which the inlet 11 is directed. In the position in which the damper closes the conduit 23 the air is recirculated passing to the blower 10.

A damper 35 is provided, controlling the inlet 11, a sprocket 36 being provided on this damper which is connected by a chain 37 to a sprocket 38 provided on the damper 33 so that the two dampers will operate synchronously, that is, when the conduit 23 is closed to the branch conduit 22, the inlet 11 is also closed so that additional air or other drying medium is not brought into the apparatus but the drying medium therein is recirculated. The dampers are shown in an intermediate position, part of the drying medium being recirculated and mixed with the fresh drying medium. The arrangement permits of any degree of re-circulation. The re-circulation of the drying medium containing moisture and mixed with fresh drying medium so that it has a capacity for absorbing more moisture, prevents the sudden heating and consequent crusting of the surface of the globules of material without drying the interior. By a regulated addition of the moist drying medium to the fresh drying medium, and in connection with the re-circulation, acceleration and heating, the thorough, entirely penetrating, drying of the material results.

In order to provide for cleaning the catcher 24 a by-pass or conduit 39 is provided connecting the conduits 23 and 29, and provided at its ends with dampers 40 and 41 adapted to be operated synchronously by gears 42 and sprockets 43 and 44 connected by a chain 45, the by-pass being closed in the full line position while in the dotted line position the dust catcher 24 is shut off and the air passes directly through the by-pass from the conduit 23 to the conduit 29.

With my improved apparatus a very efficient drying of material may be carried out, the spraying of the material into the column of high velocity air resulting in a breaking up of the material into small particles or globules and a consequent thorough and uniform drying, the particles being individually surrounded and carried along by the heated air or other drying medium.

I have illustrated and described a preferred and satisfactory embodiment of my invention but it is obvious that changes may be made therein within the spirit and scope thereof as defined in the appended claims.

I claim:

1. In a drying apparatus, a conduit, means for supplying a heated drying medium to said conduit, means for spraying the material to be dried into the drying medium, a primary collector for the dried material interposed in said conduit, a secondary collector connected to said conduit in spaced relation to the primary collector, and optionally operable means for either re-circulating the drying medium through said conduit and the primary collector, but not through the secondary collector or for directing the drying medium through the secondary collector.

2. In a drying apparatus, a conduit, a collector interposed in said conduit and having a jacket, means for supplying a fluid drying medium to said conduit, means for introducing the material to be dried into said conduit, and means for directing the humidified drying medium after it has passed through the collector into said jacket into direct contact with the walls of the collecting chamber.

3. In a drying apparatus, an endless conduit, a collecting chamber interposed in said conduit and having its walls surrounded by a jacket, and means for circulating a constantly renewed fluid drying medium through said endless conduit and the jacket of the collecting chamber in immediate contact with the walls of said chamber.

4. In a drying apparatus, a conduit, means for supplying a column of heated drying medium thereto at a relatively high velocity, means removed therefrom for receiving the dried material, means intermediate said drying medium supplying means, and said material receiving means adapted to spray the material to be dried into said column of said drying medium, a re-circulation conduit extending from said material receiving means to said drying medium supplying means, means for regulating the proportionate flow of the re-circulated drying medium and the fresh drying medium, a secondary material receiving means in communication with said last-mentioned conduit, regulation means adapted to either cut off the flow of said drying medium from said material receiving means to either the said secondary material receiving means or the said drying medium supplying means, or to regulate the flow of said drying medium from said material receiving means to the said secondary material receiving means relatively to the flow of said drying medium from said material receiving means to said drying medium supplying means.

5. In a drying apparatus of the character described, a relatively long conduit, means for supplying a column of heated drying medium thereto at a relatively high velocity, means adapted to spray the material to be dried to said column of drying medium, collector means adapted to receive the dried material from said conduit, a branch conduit adapted to convey said drying medium to the atmosphere, a secondary collector interposed in said branch conduit adapted to receive the material not received in said first mentioned collector, and a controllable by-pass in said branch conduit adapted to shut off said secondary collector.

In testimony that he claims the foregoing as his invention he has signed his name hereunder.

CROSBY FIELD.